(12) United States Patent
Freestone et al.

(10) Patent No.: US 12,246,857 B2
(45) Date of Patent: Mar. 11, 2025

(54) SATELLITE BOOM END EFFECTOR

(71) Applicant: Maxar Space LLC, Palo Alto, CA (US)

(72) Inventors: Michael Freestone, Woodside, CA (US); Sean Dougherty, Arvada, CO (US)

(73) Assignee: Maxar Space LLC, Palo Alto, CA (US)

( * ) Notice: Subject to any disclaimer, the term of this patent is extended or adjusted under 35 U.S.C. 154(b) by 63 days.

(21) Appl. No.: 17/707,475

(22) Filed: Mar. 29, 2022

(65) Prior Publication Data

US 2023/0257137 A1    Aug. 17, 2023

Related U.S. Application Data

(60) Provisional application No. 63/310,077, filed on Feb. 14, 2022.

(51) Int. Cl.
  *B64G 1/64*  (2006.01)
  *B64G 1/22*  (2006.01)
  *B64G 1/66*  (2006.01)

(52) U.S. Cl.
  CPC .............. *B64G 1/64* (2013.01); *B64G 1/222* (2013.01); *B64G 1/66* (2013.01)

(58) Field of Classification Search
  CPC .. B64G 1/264; B64G 1/222; B64G 2004/005; B64G 1/66; B64G 1/1078
  See application file for complete search history.

(56) References Cited

U.S. PATENT DOCUMENTS

| | | | |
|---|---|---|---|
| 7,823,837 B2 * | 11/2010 | Behrens | B64G 1/1078 244/172.4 |
| 10,435,183 B1 | 10/2019 | Schwarz | |
| 2003/0183726 A1 | 10/2003 | Lounge et al. | |
| 2006/0145024 A1 * | 7/2006 | Kosmas | B64G 1/1078 244/172.5 |
| 2008/0237400 A1 * | 10/2008 | Gryniewski | B64G 1/14 244/172.4 |

(Continued)

FOREIGN PATENT DOCUMENTS

EP    2666723    11/2013

OTHER PUBLICATIONS

E. Mayer, J. Hermel, and A. W. Rogers. Thrust Loss Due to Plume Impingement Effects, Jul. 29, 1986 American Institute of Aeronautics and Astronautics, Inc. (Year: 1986).*

(Continued)

*Primary Examiner* — Brady W Frazier
*Assistant Examiner* — Peter A Taraschi
(74) *Attorney, Agent, or Firm* — Pearl Cohen Zedek Latzer Baratz LLP

(57) ABSTRACT

An orbital satellite has a pair of multi-axis booms including both thrusters for course/attitude adjustment and an end effector for grappling payloads and manipulating other tools and objects. The satellite may launch with a primary payload affixed to a bus and one or more secondary payloads affixed to an ESPA ring. Once in orbit, the end effector may be used to grapple the primary and/or secondary payloads and rearrange them on the bus. In further aspects, the end effector may be used to make bus repairs or take measurements, or hold tools that are used to make bus repairs or take measurements.

18 Claims, 12 Drawing Sheets

(56) References Cited

U.S. PATENT DOCUMENTS

2009/0166476 A1* 7/2009 Termini .................. B64G 1/26
  244/158.6
2019/0023421 A1* 1/2019 Nicholson ............ B64G 1/2427

OTHER PUBLICATIONS

International Search Report and Written Opinion dated Apr. 17, 2027 in International Patent Application No. PCT/US2023/010464.
English language Abstract for EP2666723 published Nov. 27, 2013.
Response to Office Action dated Oct. 28, 2024 in European Patent Application No. 23704532.3.

* cited by examiner

SATELLITE BOOM END EFFECTOR

PRIORITY DATA

The present application claims priority to U.S. Provisional Patent Application No. 63/310,077, filed on Feb. 14, 2022, entitled "SATELLITE BOOM END EFFECTOR", which application is incorporated by reference herein in its entirety.

BACKGROUND

Satellites orbit the Earth providing a constellation of communication nodes for Earth's communications systems, as well as performing a variety of other functions. Satellites in general may include one or more payloads carried by a spacecraft (also known as a bus). Once in orbit, the bus frequently uses thrusters deployed on multi-axis booms for example for orbit raising, station-keeping and to make attitude adjustments when the momentum wheels are spun down. These thrusters are used infrequently. For example, East/West station-keeping correction is performed once every few weeks, while North/South station-keeping correction is performed once every few days. Conventionally, the booms on which the thrusters are mounted are dedicated to the thrusters. As such, the versatile multi-axis booms go largely unused while the bus is in orbit.

SUMMARY

In one aspect, the present disclosure relates to an orbital satellite having a pair of multi-axis booms including both thrusters for course/attitude adjustment and an end effector for grappling payloads and manipulating other tools and objects. The satellite may launch with a primary payload affixed to a bus and one or more secondary payloads affixed to an ESPA ring. Once in orbit, the end effector may be used to decouple the primary and/or secondary payloads and rearrange them on the bus. Alternatively, the end effector may be used to dispatch a payload or handoff a payload with another satellite. In another aspect of the present technology, the end effector may rearrange, dispatch or handoff other components on the bus, such as the bus subsystems or fuel canisters. In further aspects, the end effector may be used to make bus repairs or measurements, or acquire tools that are used to make bus repairs or measurements.

In another aspect, the present technology relates to a satellite comprising a bus and a boom having a first end mounted to the bus, and a second end distal from the first end. The satellite further comprises a thruster mounted on the second end of the boom configured to provide thrust to the satellite, and an end effector mounted on the second end of the boom configured to acquire objects.

In a further aspect, the present technology relates to a satellite comprising a bus having components, a payload affixed to the bus, and a boom having a first end mounted to the bus, and a second end distal from the first end. The satellite further comprises a thruster mounted on the second end of the boom configured to provide thrust to the satellite, and an end effector mounted along a length of the boom, the end effector configured to grapple the components and payload.

In a still further aspect, the present technology relates to a satellite, comprising a bus and a boom having a first end mounted to the bus, and a second end distal from the bus. The satellite further comprises a thruster mounted on the second end of the boom configured to provide thrust to the satellite, and an end effector mounted on the second end of the boom, the end effector comprising grappling fingers configured to acquire a grappling fixture. Here, the grappling fixture is affixed to one or more of a primary payload, a secondary payload, an ESPA (evolved expendable launch vehicle (EELV) secondary payload adapter) ring, and a tool configured to affect repairs on the satellite.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

Figure 1:
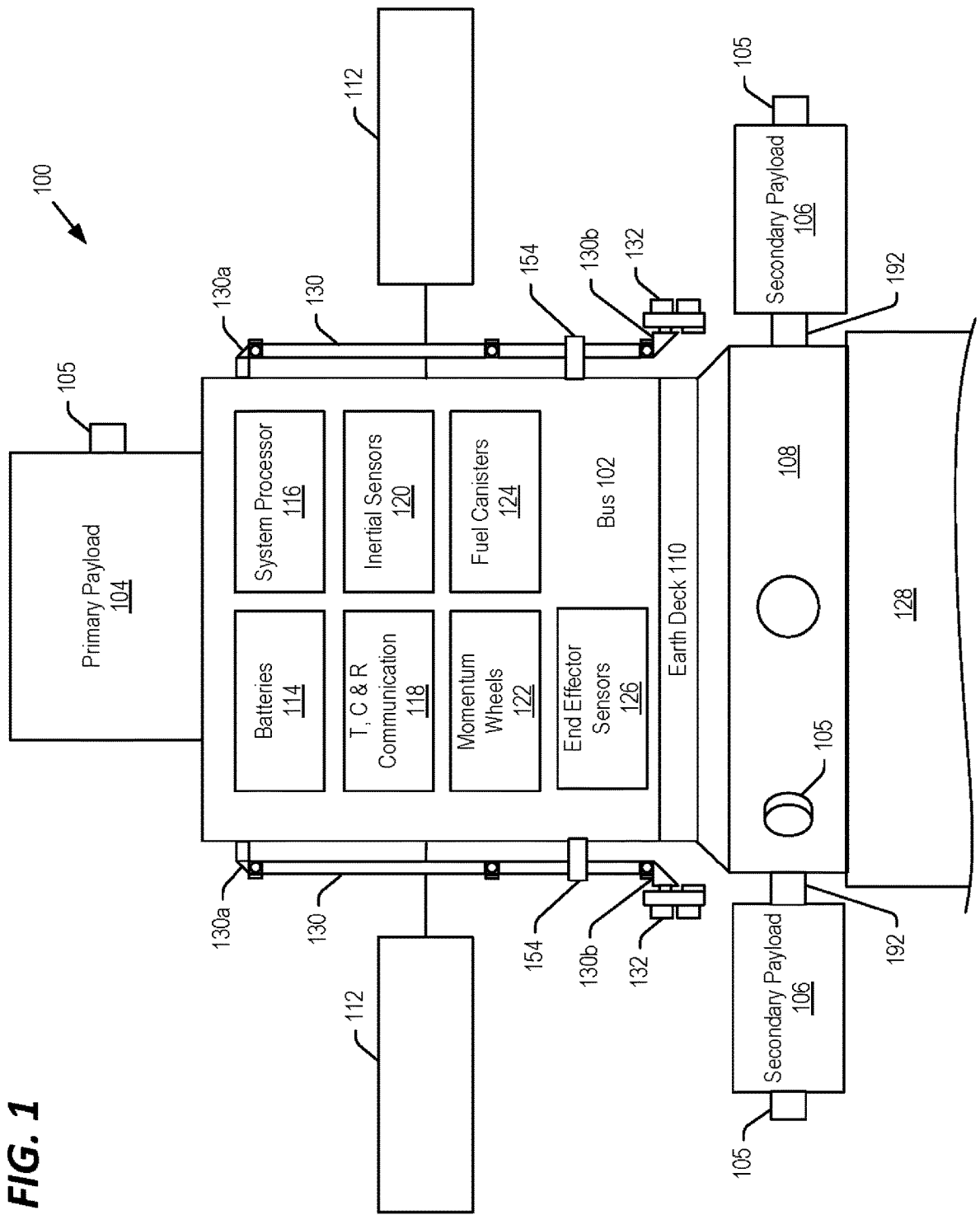
FIG. 1 is a diagram of a satellite according to embodiments of the present technology.

In one aspect, technology is described for an orbital satellite having a pair of multi-axis booms each including thrusters for course/attitude adjustment and an end effector for grappling payloads and manipulating other tools and objects. The multi-axis booms each include a first end mounted to the bus, and a second end including the thrusters and the end effector, though it is conceivable that end effectors be positioned at one or more other locations between the first and second ends of each boom. The end effectors are positioned relative to the thrusters so as to be outside of the propulsive stream generated by the thrusters.

In embodiments, the end effectors may be multi-functional tools used for grappling payloads and/or making repairs on the bus while the bus is in orbit. For example, the end effectors may be used to remove and relocate secondary payloads affixed to an ESPA ring once the bus is in orbit. Alternatively, the end effector may be used to load expired payloads onto an ESPA ring, or transfer expired payloads to another satellite or tug while acquiring a new payload. The end effectors may further be used to make repairs or take measurements on the bus while in orbit or while on a planetary or lunar surface. Each end effector may be configured to make repairs or take measurements itself, or to grip a variety of tools for making repairs and taking measurements. The acquired components and tools may be configured with a customized structural interface which can be affixed to and detached from the end effector. In embodiments, the end effectors may be powered, and/or they may have their own electrical current source so that tools which connect to the end effector may be powered.

It is understood that the present technology may be embodied in many different forms and should not be construed as being limited to the embodiments set forth herein. Rather, these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

The terms "longitudinal" and "transverse," "top" and "bottom," "upper" and "lower" and "vertical" and "horizontal," and forms and synonyms thereof, as may be used herein are by way of example and illustrative purposes only, and are not meant to limit the description of the technology inasmuch as the referenced item can be exchanged in position and orientation.

For purposes of this disclosure, a connection may be a direct connection or an indirect connection (e.g., via one or more other parts). In some cases, when a first element is referred to as being connected, affixed, mounted or coupled to a second element, the first and second elements may be directly connected, affixed, mounted or coupled to each other or indirectly connected, affixed, mounted or coupled to each other. When a first element is referred to as being directly connected, affixed, mounted or coupled to a second element, then there are no intervening elements between the first and second elements (other than possibly an adhesive or melted metal used to connect, affix, mount or couple the first and second elements).

FIG. 1 is a high-level illustration of a satellite 100 in which the present technology may be implemented. Satellite 100 includes a bus 102 carrying a primary payload 104 and one or more secondary payloads 106 mounted to an ESPA (evolved expendable launch vehicle (EELV) secondary payload adapter) ring 108. The various payloads 102, 104 may each include one or more grappling fixtures 105, the purpose of which are explained below. Grappling fixtures 105 may be provided on various other components, including for example ESPA ring 108 and other components shown schematically in FIG. 1. The number of secondary payloads 106 are shown by way of example only and may vary in further embodiments. In some embodiments, the secondary payloads 106 may be omitted entirely. The embodiment of satellite 100 shown is configured for so-called inverted flight, where the secondary payloads 106 are mounted to an earth deck 110 at launch. However, in further embodiments, the payloads may be reversed with the secondary payloads mounted at the opposite end of bus 102.

Bus 102 may further include a variety of components for the operation of satellite 100, several of which are shown schematically in FIG. 1. For example, the bus components include solar panels 112 and one or more batteries 114 for providing power to the satellite components. The bus 102 may further include a system processor 116 and T, C & R (telemetry, commands and ranging) communication and processing equipment 118. T, C & R may be referred to by other names, such as T, T & C (tracking, telemetry and control), as is known in the art. T, C & R communication and processing equipment 118 includes communication and processing equipment for telemetry, commands from the ground to the satellite and ranging to operate the satellite. System processor 116 is used to control and operate satellite 100. An operator on the ground can control satellite 100 by sending commands via T, C & R communication and processing equipment 118 to be executed by system processor 116.

Bus 102 may further include inertial sensors 120 and momentum wheels 122. Inertial sensors 120 are used to determine the position and three-axis orientation of satellite 100, and momentum wheels 122 may be used for three-axis control of the orientation of the satellite 100, based on feedback from the inertial sensors 120. As is known, at some point during their operation, one or more of the momentum wheels may reach their maximum rotational velocity. At this point, the processor 116 may spin down the one or more momentum wheels. While momentum wheels are spinning down, orientation control of the satellite 100 may be achieved by the thrusters, as is explained below. Bus 102 may further include fuel canisters 124 for powering the thrusters.

Satellite 100 may also have a pair of booms 130 affixed to bus 102. The booms 130 may include proximal ends 130a affixed to the bus 102, and distal ends 130b opposite the proximal ends 130a. The distal ends 130b of booms 130 may include the thrusters 132 and, in accordance with the present technology, may further include end effectors 136 as explained below. While a pair of thrusters 132 are shown at the distal ends 130b of booms 130, each boom may include a single thruster 132 or more than two thrusters 132 in further embodiments. While the proximal ends 130a of booms 130 are shown mounted toward a first end of the bus 102, proximate the primary payload 104, it is understood that the mounting points of the booms 130 to the bus 102 may be anywhere between the first and second ends of bus 102. In embodiments, the first and second booms may be diametrically opposed to each other on bus 102, though they need not be in further embodiments.

Once brought to its initial or final orbit by a rocket 128 (a portion of which is shown in FIG. 1), the satellite 100 disengages from the rocket 128. If not the final orbit, the thrusters 132 are used to move and orient the satellite 100 to its final geostationary or non-geostationary orbital location. A geosynchronous orbit is one having a period of rotation synchronous with that of the Earth's rotation in the plane of the Equator so that it remains stationary in relation to a fixed point on the Earth's surface.

Figure 2:
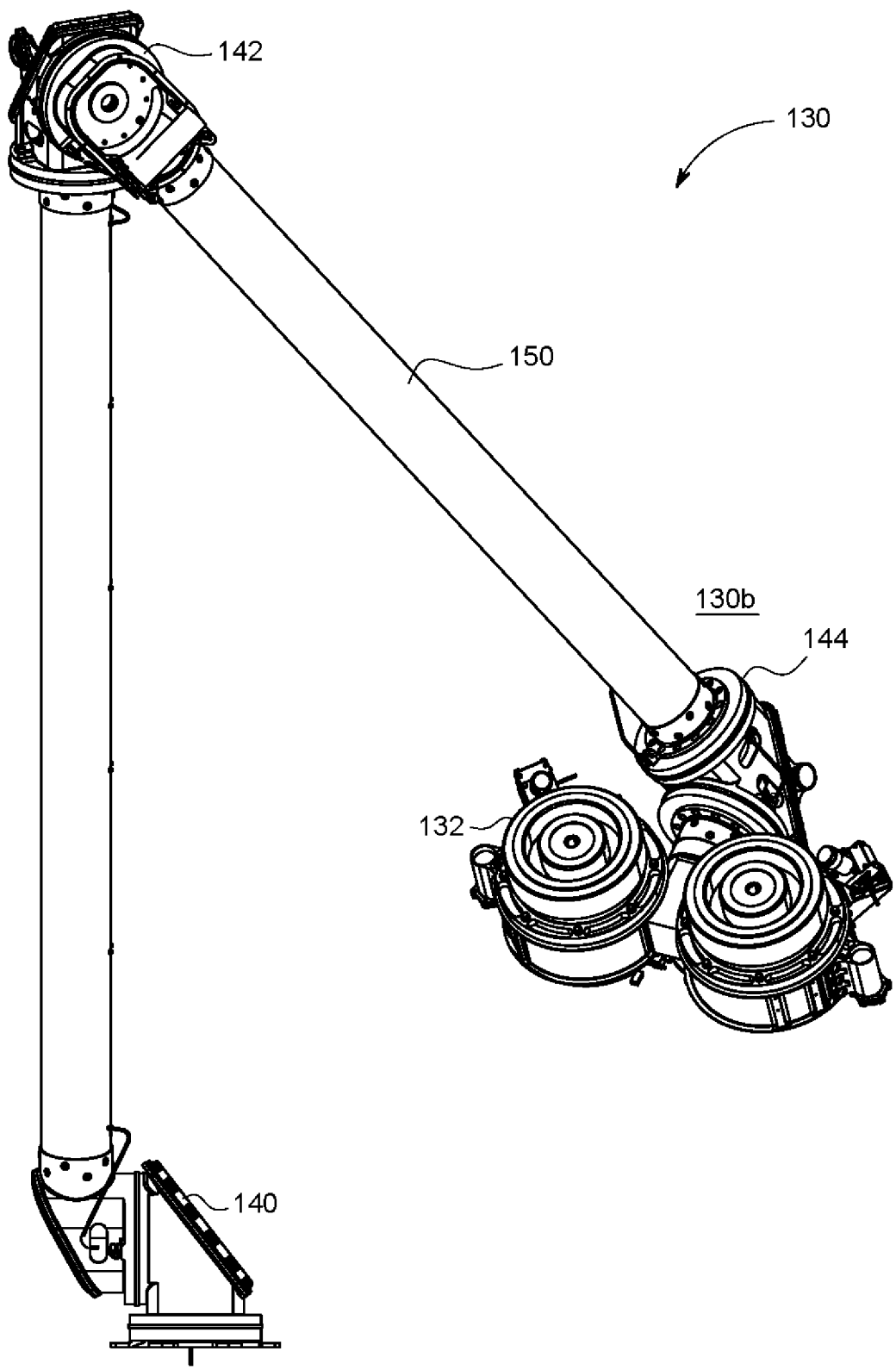
FIGS. 2 and 3 are front and rear perspective views of a boom including thrusters and an end effector according to embodiments of the present technology.
Figure 3:
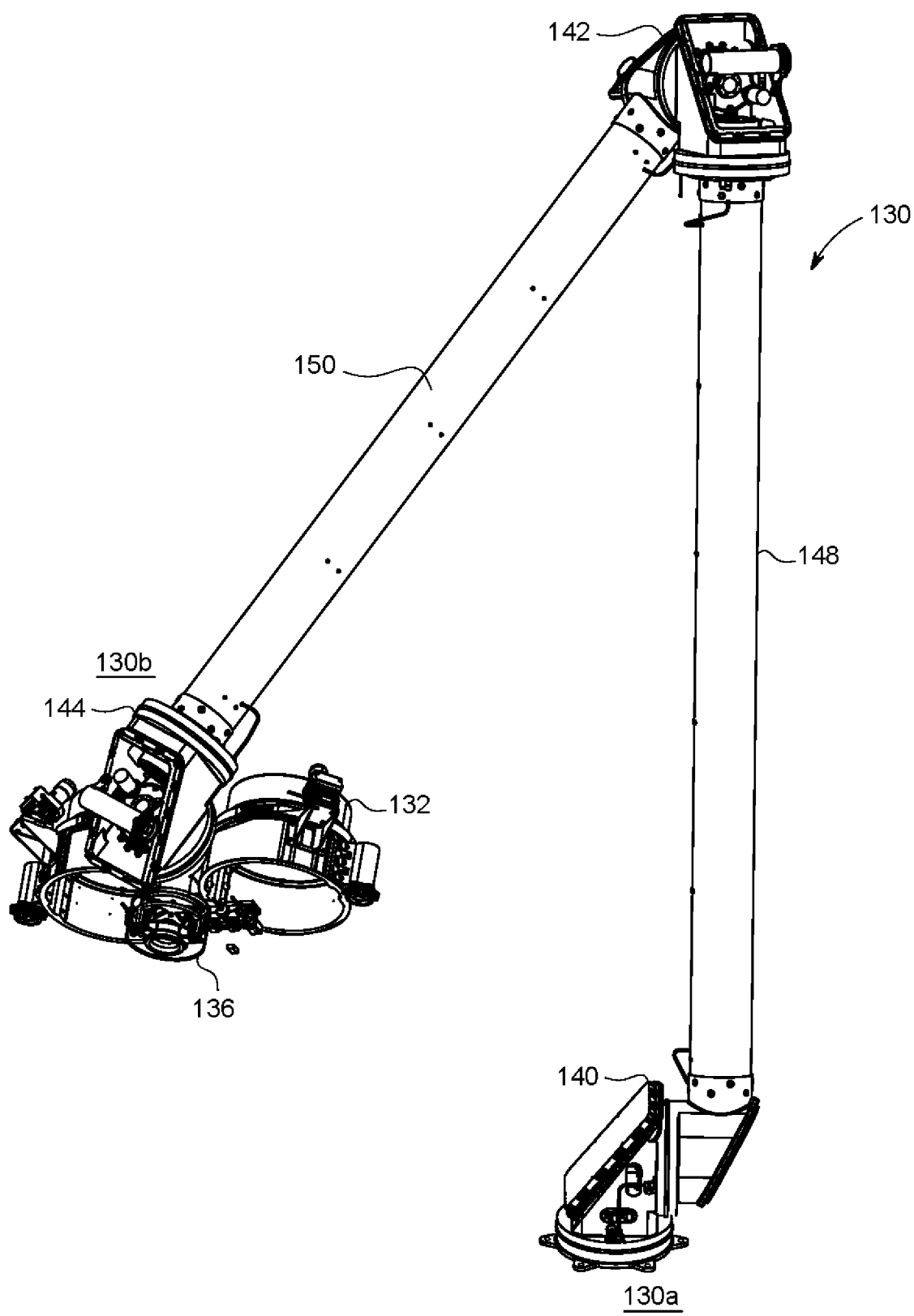

Further detail of the booms 130 will now be explained with reference to the front and rear perspective view of FIGS. 2 and 3, respectively. FIGS. 2 and 3 show a single boom 130, but the following description applies to both booms 130. Each boom may include a shoulder joint 140, and elbow joint 142 and a wrist joint 144, which together provide multi-axis pitch, yaw and roll movement of the boom distal end 130b, including for example with 3, 4, 5, 6 or 7 degrees of freedom of movement. This allows the distal end 130b of the boom 130 to be translated to a wide variety of positions and oriented in a wide variety of angular positions. Thus, under the control of the system processor 116, the thrusters 132 may be positioned and oriented as needed to accomplish movement and/or reorientation of the satellite. Similarly, under the control of the system processor 116, the end effectors 136 may be positioned and oriented as needed to acquire objects or components as explained below.

In one example, shoulder joint 140 may include a motor and bearings (not shown) to drive a first arm 148 with pitch and yaw rotation relative to the shoulder joint 140. Elbow joint 142 may include a motor and bearings (not shown) to drive a second arm 150 with yaw and roll rotation relative to the elbow joint 142. And wrist joint 144 may include a motor and bearings (not shown) to drive the thrusters 132 and end effector 136 with pitch and roll rotation relative to the wrist joint 144.

The above-described components of booms 130 accomplishing the movements and rotations of distal end 130b are by way of example only. It is understood that booms 130 may include a variety of other components configured to move the distal end 130b with multiple degrees of freedom, including 3, 4, 5, 6 and 7 degrees of freedom. The lengths of booms 130 shown in FIG. 1 are for illustrative purposes only, and the first and second arms 148, 150 may be sized so that the booms 130 together are able to access any point on satellite 100. It is conceivable that the booms 130 have additional arms and joints in further embodiments. The booms 130 may be stowed during launch on rocket 128 by launch locks 154 (FIG. 1), which may engage the booms 130 anywhere along their lengths.

Figure 4:
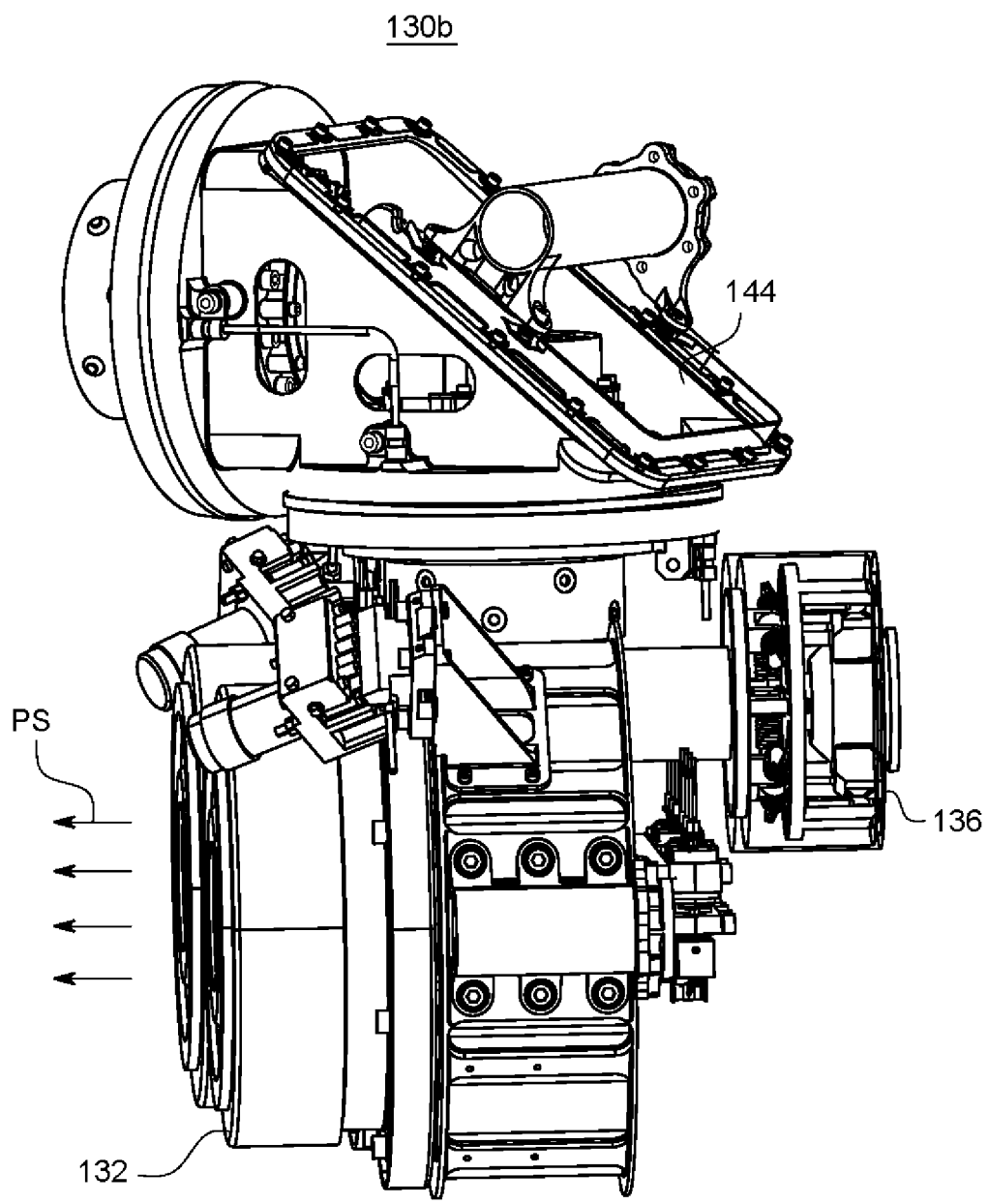
FIGS. 4-6 are different perspective views of a distal end of a boom including thrusters and an end effector according to embodiments of the present technology.
Figure 5:
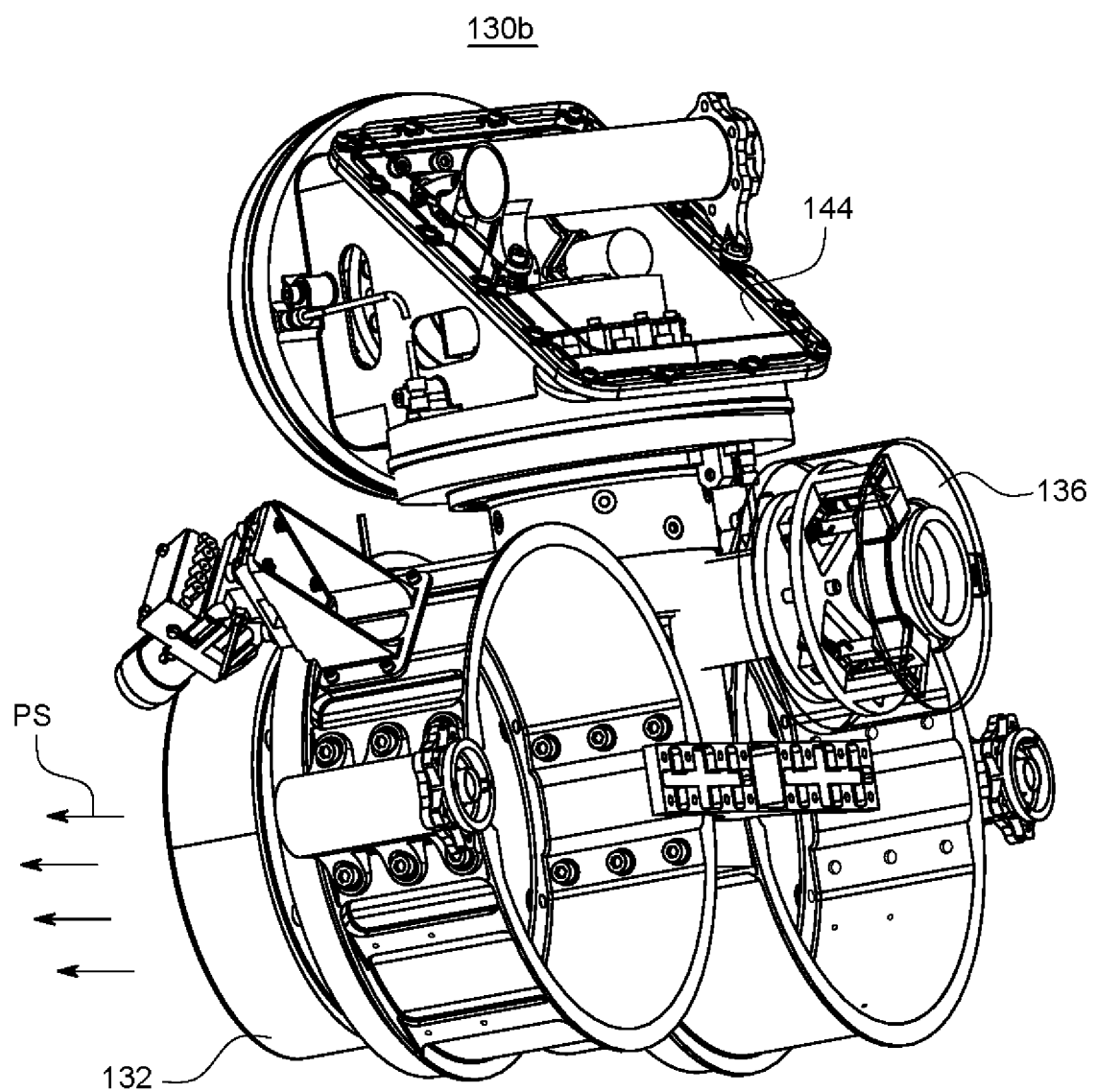
Figure 6:
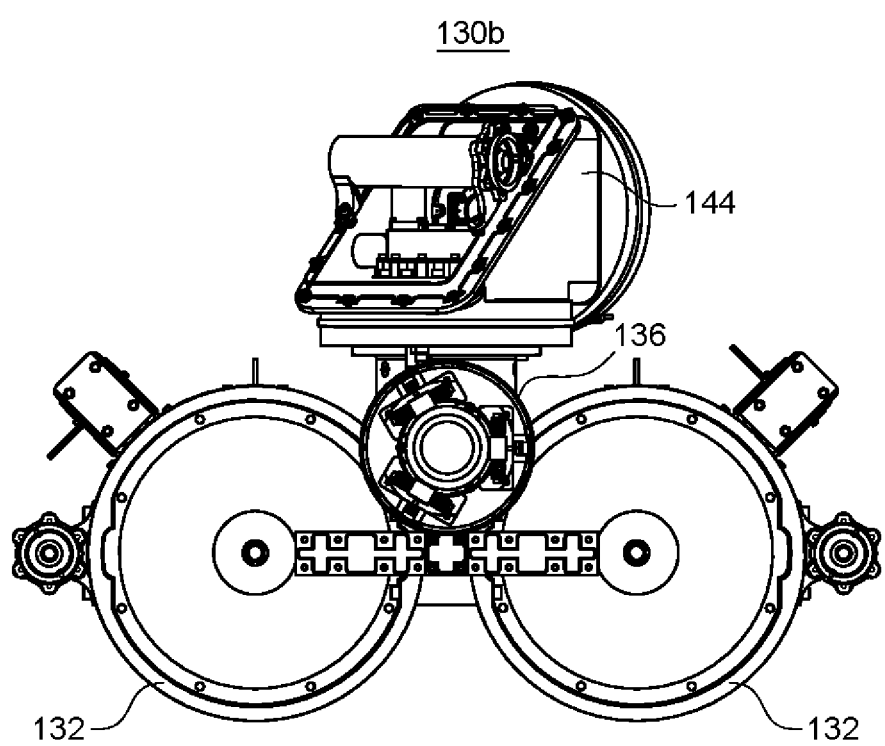

FIGS. 4 through 6 show various perspective views of the distal end 130b of a boom 130 including the thrusters 132 and an embodiment of the end effector 136. In embodiments, thrusters 132 may be ion thrusters which create thrust by accelerating ions using electricity. Other types of thrusters are contemplated. The thrusters 132 will create a thrust or propulsion stream in the direction of arrows PS in FIGS. 4 and 5 to move or reorient the satellite 100. When thrust is needed, the booms 130 will position the thrusters in the correct position and orientation under control of processor 116. When movement is desired, the direction of propulsion stream PS will lie along an axis through a center of gravity of the satellite 100. When a change in orientation of the satellite is desired, the direction of propulsion stream PS will lie along an axis that does not pass through the center of gravity of the satellite 100.

In accordance with aspects of the present technology, the end effector 136 may be mounted at the distal end 130b of boom 130 opposite side on which the thrusters 132 are mounted. In further embodiments, one or more end effectors 136 may be mounted elsewhere at distal end 130b outside of the propulsion stream of thrusters 132, and/or elsewhere along the length of boom 130. As such, the thrusters 132 have no effect on the end effector 136. However, it is conceivable that a shield be erected between the thrusters 132 and the end effector 136 in further embodiments.

Figure 7:
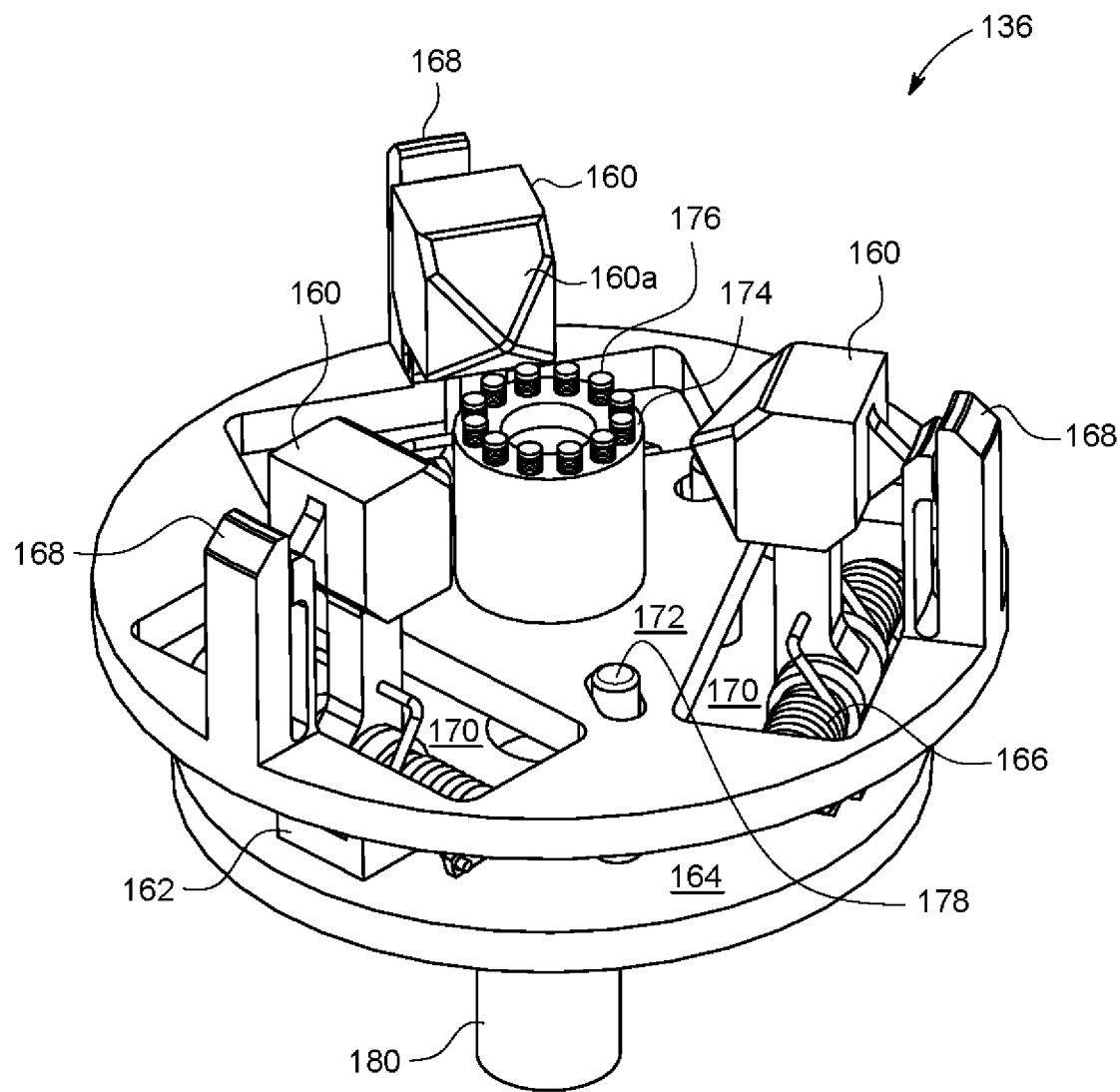
FIGS. 7-9 are perspective views of an end effector engaging a grappling fixture according to embodiments of the present technology.
Figure 8:
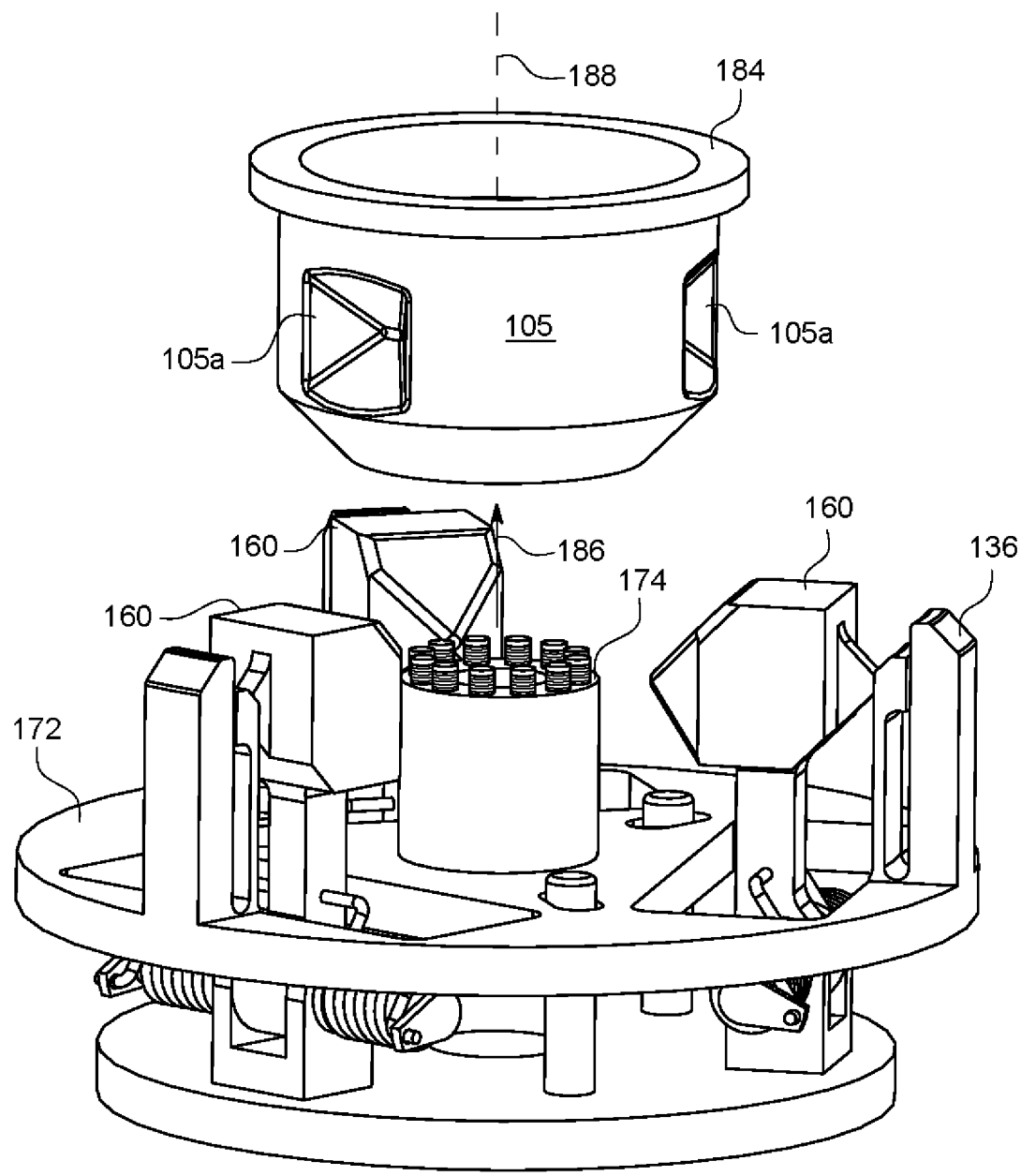
Figure 9:
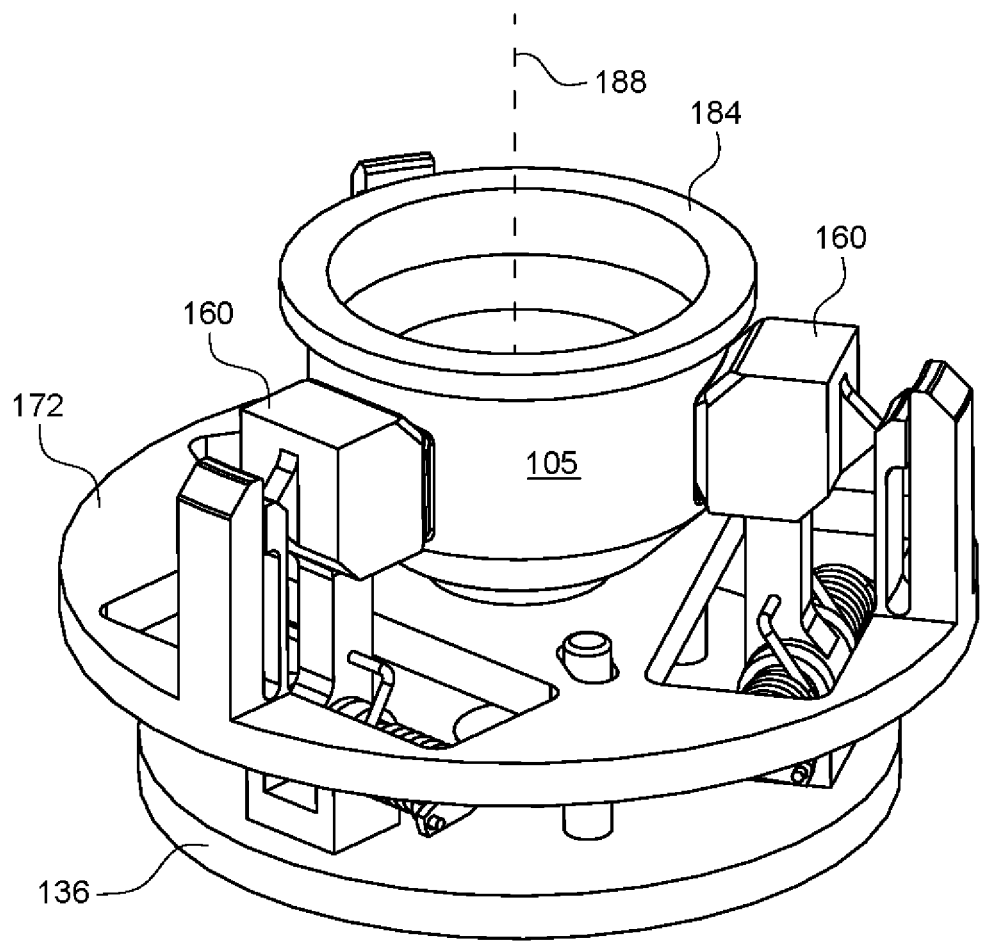

FIGS. 7 through 9 illustrate one embodiment of an end effector 136 and a technique for grappling payloads and other satellite components using the end effector 136. As explained below, the end effector 136 shown and described is one embodiment of an end effector, and the end effector affixed to boom 130 may have a great many other configurations in further embodiments. The end effector 136 shown in FIG. 7 includes three grappling fingers 160 pivotally mounted to respective hubs 162 in a baseplate 164. Each grappling finger 160 includes protruding engagement tines 160a which mate within corresponding recesses in a grappling fixture as explained below. The three grappling fingers 160 with their engagement tines 160a are sufficient to define three secure engagement points with a component to be grappled by the end effector 136. However, it is conceivable that the end effector includes two grappling fingers or more than three grappling fingers in further embodiments.

Each grappling finger 160 may move between a first, retracted position where a component to be grappled may be freely inserted into the end effector 136 and freely removed from the end effector 136, and a second, extended position where the grappling fingers 160 secure the component to the end effector. Springs 166 are shown biasing the grappling fingers 160 into their retracted positions against posts 168. Motors (not shown) within each hub 162 may be used to move the grappling fingers from their retracted positions to their extended positions, for example under the control of system processor 116. In further embodiments, the springs may bias the grappling fingers 160 into their extended positions, and the respective motors may move them to their retracted positions.

Each of the grappling fingers 160 extends through a slot 170 formed in a support plate 172, on which support plate 172 the posts 168 are mounted or otherwise formed. The support plate 172 may be bolted or otherwise affixed to the baseplate 164, and defines a surface on which grappled components are supported as explained below. The end effector 136 further includes a central hub 174 affixed to or otherwise formed on the support plate 172. The end effector 136 may be affixed to a voltage source (not shown) which provides current to pins 176 on the central hub to enable the end effector to power a component mounted onto the end effector 136 as explained below. The pins 176 may be pogo pins or the like, which receive current when pressed downward by an acquired object as explained below. The number of pins 176 is shown by way of example and there may be more or less pins in further embodiments. Power may be supplied to the end effector by other means in further embodiments, such as for example by a pin 178 extending from the baseplate 164 through an opening in the support plate 172.

The end effector 136 may be affixed to the distal end 130b of the boom 130 by a post 180. It is conceivable that the end effector 136 be rotationally mounted on the post 180 (or the post 180 be rotationally mounted to the boom 130) to facilitate proper radial positioning of the tines 160b of the grappling fingers 160 within the recesses of a grappling fixture as explained below.

FIG. 8 shows the end effector 136 acquiring an object affixed to a grappling fixture 105. The object being acquired is not shown in FIG. 8, but as shown for example in FIG. 1, a variety of components on the satellite 100 may have affixed grappling fixtures 105 so as to enable acquisition of these components by the end effector 136. These components include for example the primary payload 104, the one or more secondary payloads 106 and the ESPA ring 108. Other components on the satellite 100 may also have grappling fixtures, such as for example the batteries (or battery pack) 114, the momentum wheels 122, the solar panels 112 and/or the fuel canisters 124. The grappling fixture 105 may include a ring 184 which may be bolted, glued or otherwise affixed to a payload or other object to enable acquisition by the end effector 136.

The grappling fixture 105 is customized structural interface customized to operate with end effector 136 to ensure a secure interface and attachment of an acquired object or component to the end effector 136. As shown in FIG. 8, a grappling fixture 105 may be spherical, and may include recesses 105a which correspond in number and radial positions to the number and radial positions of the grappling fingers 160 around the circumference of the end effector

136. The recesses 105*a* may have concave contours that match the convex contours of the tines 160*a* on grappling fingers 160.

As described above, the boom 130 is capable of positioning an end effector 136 with multiple degrees of freedom, translationally and rotationally. The boom 130 may position the end effector 136 to approach an object to be acquired along an axis shown by arrow 186 concentric with a central axis 188 of the grappling fixture 105. Thus, the end effector 136 is centered with respect to the grappling fixture 105. The boom 130 may also position the end effector 136 so as to be square with the grappling fixture 105 (i.e., a plane of the support plate 172 is perpendicular to the central axis 188 of grappling fixture 105).

With this approach, the end effector 136 positions itself around the grappling fixture 105 of an object or component to be acquired on the end effector. As noted, the satellite 100 may include end effector sensors 126 (shown schematically in FIG. 1) which guide the end effector 136 into proper engagement over a grappling fixture 105 on an object or component to be acquired on end effector 136. The end effector sensors 126 may be any of a variety of sensors, including for example one or more cameras or position detecting sensors (in the end effector 136, in the grappling fixture 105 and/or elsewhere on the bus 102). The positioning of the end effector 136 over a grappling fixture 105 may be accomplished manually, using images sent wirelessly from the end effector sensors 126 to terrestrial control station and positioning control signals from the control station. Alternatively, the positioning of the end effector 136 over a grappling fixture 105 may be accomplished automatedly by system processor 116, using images and/or signals received from the end effector sensors 126.

In addition to proper positioning of the end effector 136 over the grappling fixture 105, the end effector may be properly rotationally oriented so that the grappling fingers 160 of the end effector radially align with the recesses 105*a* of grappling fixture 105. The proper rotational orientation may be accomplished by the boom 130. As noted above, the end effector 136 may be rotationally mounted on the boom 130. In addition to or instead of proper rotational positioning by the boom, the end effector 136 may rotate on the boom to accomplish the proper rotational orientation of the grappling fingers 160 to the recesses 105*a*. Again, the end effector sensors 126 may be used to ensure the proper rotational orientation of the grappling fingers 160 to the recesses 105*a*.

Referring now to FIG. 9, once properly aligned and positioned over a grappling fixture 105, the grappling fingers 160 may be actuated to their extended positions so that the tines 160*a* of each finger 160 engage within recesses 105*a* of fixture 105. At this point, the grappling fixture 105 and the attached object are securely affixed to the end effector 136. In embodiments, the end effector sensors 126 may send a signal to the system processor 116 confirming proper acquisition.

The end effector 136 acquires the grappling fixture 105 so that the central hub 174 of the end effector is received within a central aperture of the grappling fixture 105. This central aperture may include an electrical connector configured to transfer current from the pins 176 (for example) on the central hub 174 to the object affixed to the grappling fixture 105. Thus, the end effector 136 and grappling fixture 105 can power objects or components acquired by end effector 136.

Figure 10:
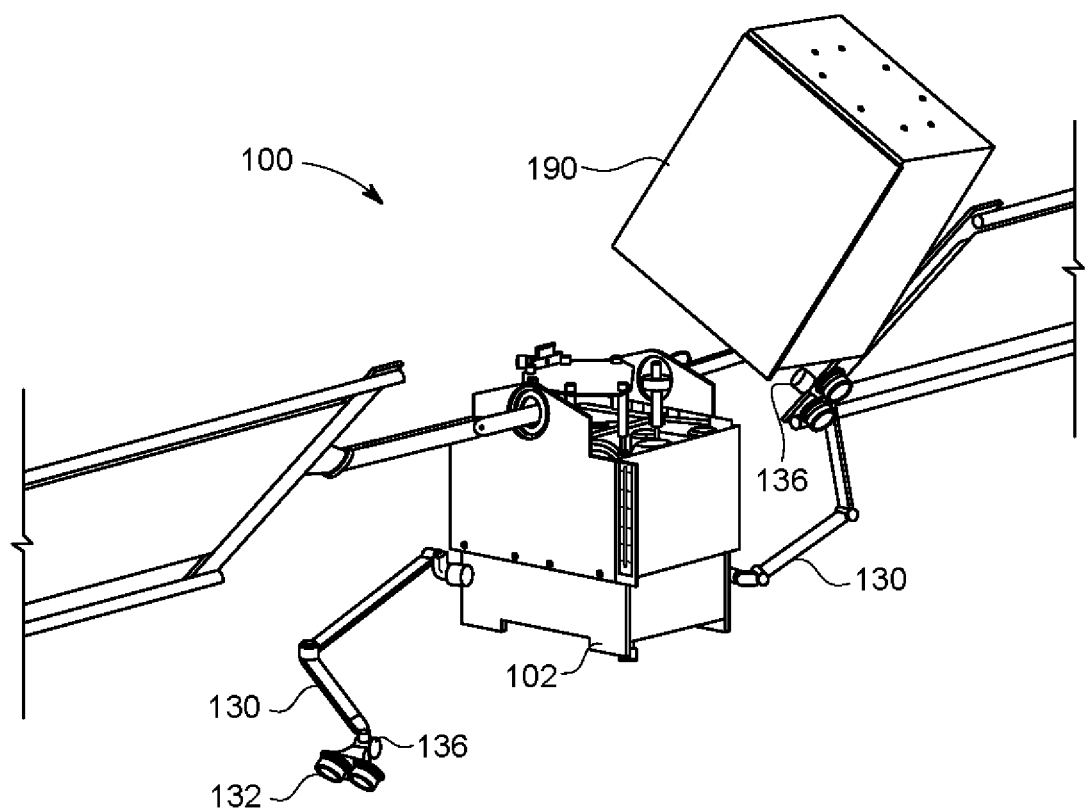
FIG. 10 is a perspective view showing a payload grappled to an end effector according to embodiments of the present technology.

Once affixed to the end effector 136 in this manner, a grappled object may be moved by repositioning the end effector 136 on boom 130. FIG. 10 shows an object 190 such as a primary payload 104 or secondary payload 106 secured to the end effector 136 on the distal end 130*b* of boom 130. Prior to being acquired on end effector 136, an attachment mechanism is used to secure the object in its position on the satellite 100. For example, FIG. 1 schematically shows attachment clips 192 affixing secondary payloads 106 to the ESPA ring 108. Once the end effector 136 has acquired an object 190 as shown in FIG. 9, the attachment mechanisms previously securing the object in place may be removed or released. This may happen automatedly by the system processor 116. In further embodiments, while the object is held on an end effector 136 on a first boom 130, the end effector 136 on the second boom 130 may remove or release the attachment mechanism. In such embodiments, the end effector 136 on the second boom 130 may have a removal tool as explained below.

As noted, the end effector 136 shown and described above is only one of a wide variety of possible configurations. It is appreciated that the end effector may have any number of other configurations, including a wide variety of jaws, claws, rings, pins, fingers and other engagement structures that are capable of acquiring another object or component. The end effector may acquire objects by purely mechanical means or by electromechanical means. In further embodiments, the end effector may also operate by magnetic means, where the end effector includes a magnet which can attract and hold objects or components. As described below, the end effector may acquire tools used to make repairs or perform other operations. One such tool that can be acquired is another type of end effector. Thus, for example, the end effector 136 shown in the figures can itself acquire a differently configured end effector, depending on the operation to be performed.

In the above embodiment, a grappling fixture, customized to the end effector, is affixed to each object or component to be acquired to ensure a proper acquisition interface. In further embodiments, the end effector may acquire objects without a customized grappling fixture on the objects. In the above embodiment, the end effector 136 includes an electrical interface to provide power to the end effector and to an acquired object. The end effector may have other interfaces in further embodiments, including for example a communications interface enabling communications between an acquired object and the system processor 116. Other possible interfaces include hydraulic and/or pneumatic interfaces to provide mechanical power to the end effector and/or an acquired object.

There are a wide variety of operations which can be accomplished with an acquired object. One typical object acquired by end effector 136 will be the primary and/or secondary payloads affixed to bus 102. Once acquired, the payload may be repositioned on the satellite 100, transferred to a second satellite rendezvousing with the first satellite, or set adrift into space for later acquisition by a tug or other satellite. First and second satellites (or a satellite and another rocket or tug) may rendezvous with each other, and then payloads may be transferred by the end effector to or from the first satellite. For example, an expired payload on the first satellite may be switched out for a new payload, thus effectively extending the life of the first satellite with respect to the function of the expired/new payload.

It is also known to launch a satellite into space with secondary payloads mounted to an ESPA ring, which may be mounted on the earth deck (as shown in FIG. 1) or elsewhere on the satellite. In one operation, once in space, the end effector 136 on a first boom 130 may remove a payload 106 from the ESPA ring 108 positioned on the earth deck 110.

The end effector 136 on the second boom 130 may then acquire and remove the ESPA ring 108. Thereafter, the payload on the first end effector 136 may place the payload on the earth deck where it gets mounted. The ESPA ring 108 may be repositioned on the satellite, or acquired by a tug or other satellite.

In addition to payloads, the end effectors 136 on booms 130 may be used to acquire other components on bus 102. These acquired components may then be repositioned on the satellite 100, transferred to a second satellite rendezvousing with the first satellite, or set adrift into space for later acquisition by a tug or other satellite. First and second satellites (or a satellite and another rocket or tug) may rendezvous with each other, and then satellite components may be transferred by the end effector to or from the first satellite. For example, expired fuel canisters or malfunctioning components on the first satellite may be switched out for new canisters and/or components, thus effectively extending the life of the first satellite with respect to thruster fuel the purpose of the malfunctioning components.

Figure 11:
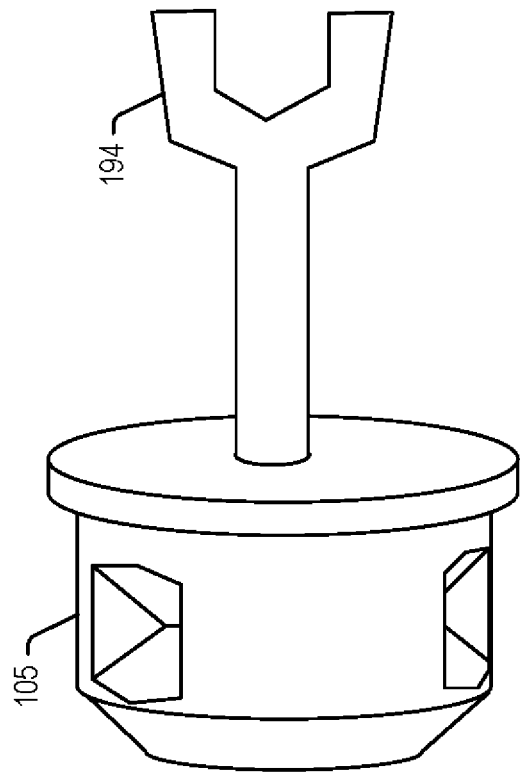
FIG. 11 is a perspective view of an end effector engaging a tool for repairs to the satellite according to embodiments of the present technology.
Figure 11:
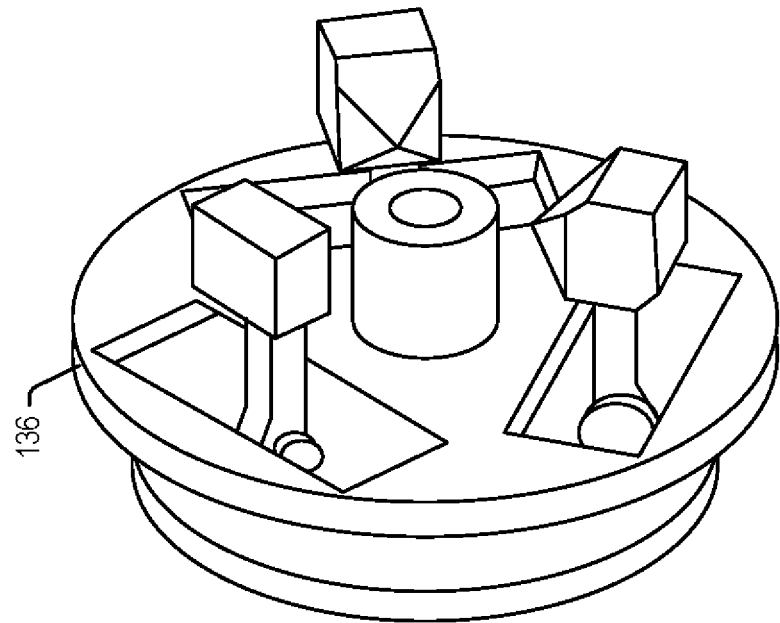

As noted, in addition to grappling payloads and other components, the end effector 136 on each boom 130 may be used to acquire a tool to perform a desired function. FIG. 11 shows a simple tool 194 acquired by end effector 136 for performing maintenance or repairs. The tool may be mounted to a structural interface customized for the end effector 136. In the embodiments of end effector 136 shown in the figures, the customized structural interface may be a grappling fixture 105, though other customized structural interfaces are possible. As described, the grappling fixture 105 may include a power connector to transfer power from the end effector 136 to the tool 194, if needed.

Tools 194 affixed to an end effector 136 may perform a variety of functions. As noted, the tool may be used to perform maintenance or repairs on the satellite 100, or another satellite rendezvousing with the satellite 100. The tools may also be a senor or measuring tool used for sensing or to take measurements. Here, the boom 130 would position the end effector 136 and sensor/measuring tool 194 proximate an object (on the satellite or not) to be sensed or measured, and then the tool 194 can gather the required information.

As noted, the tool 194 may itself be another end effector configured to acquire an object or component for transfer, or to acquire a further tool for maintenance, repairs, sensing or measurements. The tool 194 in this embodiment may be an end effector, or it may be an end effector affixed to an assembly which may have arms and joints allowing for multiple degrees of freedom of movement of the end effector affixed to end effector 136.

Figure 12:
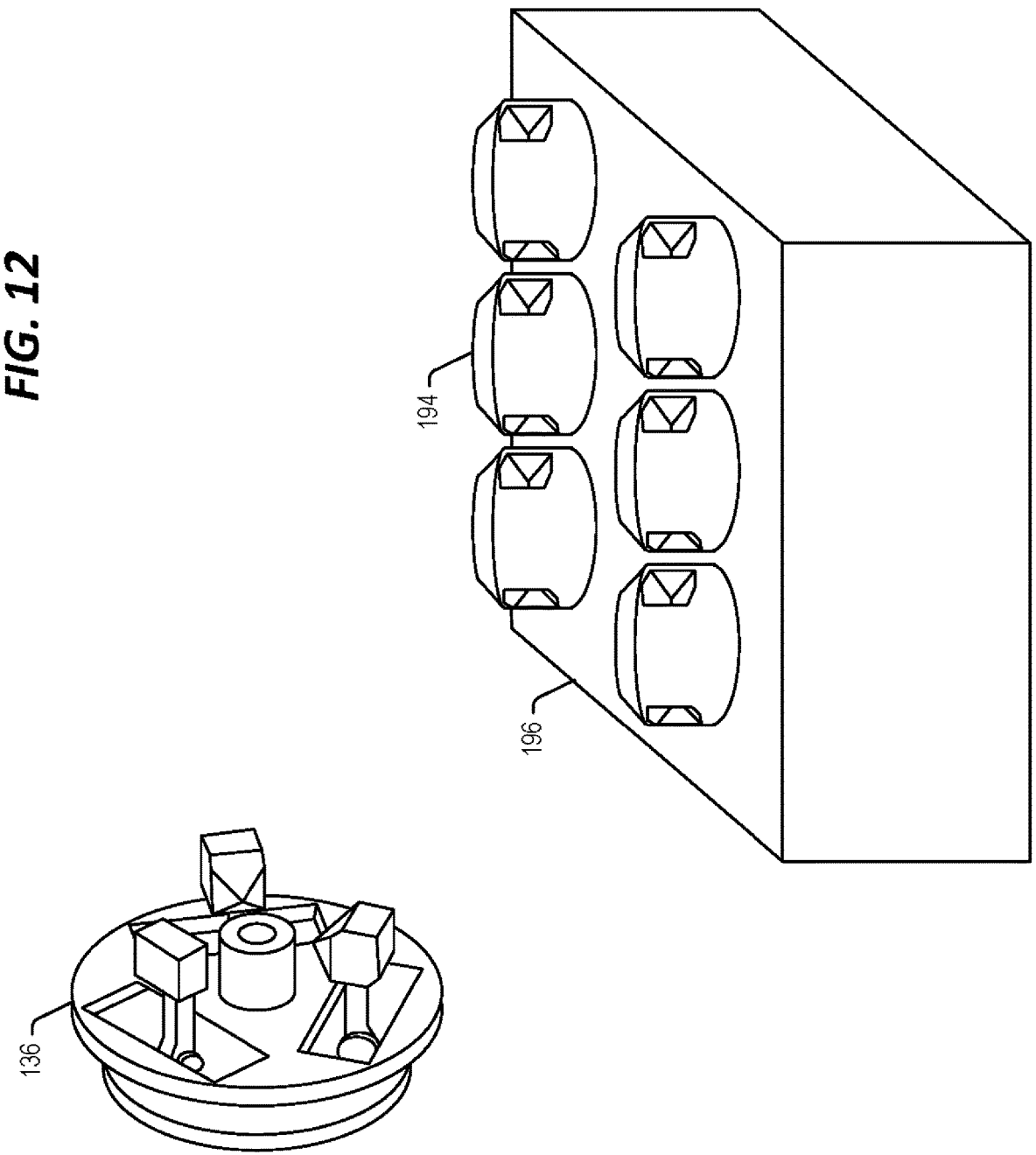
FIG. 12 is a perspective view of an end effector and a caddy of tools configured to fit on the end effector according to embodiments of the present technology.

FIG. 12 shows an example where a variety of different tools 194 are stored in a tool caddy 196. The tool caddy 196 may be affixed to the bus 102. The end effectors 136 on the ends of booms 130 can acquire and return tools 194 to and from tool caddy 196 as needed.

The present technology provides advantages in that it maximizes the utility of a satellite. By adding end effectors to the booms which already exist to carry the thrusters, the utility of the booms and overall satellite is greatly increased. As noted, the thrusters are used only intermittently, so that the end effectors can be used without inhibiting the use of the thrusters. In embodiments, the end effectors would only be used when the thrusters are not in use. However, it is possible that the end effectors and thrusters be used simultaneously, for example where the thrusters provide a force required to use a tool 194.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A satellite, comprising:
   a bus;
   a boom having a first end mounted to the bus, and a second end distal from the first end;
   a thruster mounted on the second end of the boom configured to provide thrust to the satellite, wherein the boom is configured to carry the thruster, the thruster facing in a first direction at the second end of the boom; and
   an end effector mounted on the second end of the boom configured to acquire objects, the end effector facing in a second direction opposing the first direction such that a propulsion stream exhausted from the thruster does not impact the end effector.

2. The satellite of claim 1, wherein the object acquired by the end effector is a payload.

3. The satellite of claim 1, wherein the object acquired by the end effector is a secondary payload.

4. The satellite of claim 1, wherein the object acquired by the end effector is an ESPA (evolved expendable launch vehicle (EELV) secondary payload adapter) ring.

5. The satellite of claim 1, the satellite further comprising an earth deck adjacent the bus, wherein the end effector is configured to remove a secondary payload from an ESPA (evolved expendable launch vehicle (EELV) secondary payload adapter) ring, wherein the ESPA ring is affixed to the earth deck.

6. The satellite of claim 1, wherein the object acquired by the end effector is a tool for affecting repairs on the satellite.

7. The satellite of claim 1, wherein the end effector comprises three, four, five, six or seven degrees of freedom of movement.

8. A satellite, comprising:
   a bus comprising components;
   a payload affixed to the bus;
   a boom having a first end mounted to the bus, and a second end distal from the first end;
   a thruster mounted on the second end of the boom configured to provide thrust to the satellite, wherein the boom is configured to carry the thruster; and
   an end effector mounted along a length of the boom, the end effector configured to grapple the components and payload, wherein in the end effector is mounted to face an opposite direction than a direction of a propulsion stream exhausted from the thruster.

9. The satellite of claim 8, wherein the end effector is further configured to facilitate repairs on the satellite.

10. The satellite of claim 8, wherein the end effector further comprises a power source configured to provide power to an object affixed to the end effector.

11. The satellite of claim 8, wherein the end effector is configured to mate with a customized structural interface mounted on each of the components and payload to be acquired by the end effector.

12. The satellite of claim 11, wherein the customized structural interface is a grappling fixture.

13. The satellite of claim 8, wherein the end effector comprises a communications interface enabling communications to and from a component or payload acquired by the end effector.

14. A satellite, comprising:
a bus;
a boom having a first end mounted to the bus, and a second end distal from the bus;
a thruster mounted on the second end of the boom configured to exhaust a propulsion stream providing thrust to the satellite, wherein the boom is configured to carry the thruster, the thruster facing in a first direction at the second end of the boom; and
an end effector mounted on the second end of the boom, the end effector comprising grappling fingers configured to acquire a grappling fixture, and the end effector positioned at the second end of the boom, the end effector facing in a second direction opposing the first direction such that the propulsion stream exhausted from the thruster does not impact the end effector;
wherein the grappling fixture is affixed to one or more of a primary payload, a secondary payload, an ESPA (evolved expendable launch vehicle (EELV) secondary payload adapter) ring, and a tool configured to affect repairs on the satellite.

15. The satellite of claim 14, wherein the grappling fingers are powered to move between first positions where the grappling fixture may be freely inserted into or removed from the end effector, and a second position where the grappling fingers lock the grappling fixture to the end effector.

16. The satellite of claim 14, wherein the end effector further comprises a power source configured to provide power to an object affixed to the end effector.

17. The satellite of claim 14, wherein the satellite further comprises batteries, momentum wheels and fuel canisters, wherein the end effector is capable of acquiring one or more of the batteries, momentum wheels and fuel canisters.

18. The satellite of claim 14, wherein the satellite further comprises batteries, momentum wheels and fuel canisters, wherein the end effector is capable of making repairs to one or more of the batteries, momentum wheels and fuel canisters.

* * * * *